United States Patent [19]

Neumann et al.

[11] Patent Number: 5,660,615
[45] Date of Patent: Aug. 26, 1997

[54] EXHAUST GAS SCRUBBING PROCESS

[75] Inventors: Ulrich Neumann, Kaiserslautern; Wolfgang Willing, Wöllstadt, both of Germany

[73] Assignee: Metallgesellschaft AG, Frankfurt am Main, Germany

[21] Appl. No.: 602,136

[22] Filed: Feb. 15, 1996

[30] Foreign Application Priority Data

Feb. 16, 1995 [DE] Germany ............... 195 05 231.5

[51] Int. Cl.$^6$ ................................. B01D 47/06
[52] U.S. Cl. ........................ 95/187; 55/223; 55/228; 55/229; 55/233; 95/199; 95/202; 95/211; 95/216; 95/224; 95/229
[58] Field of Search ............... 95/188, 199, 195–197, 95/228, 229, 200, 202, 205, 210, 211, 216, 221, 222, 224, 233, 235, 288, 187, 149; 55/223, 228, 229, 233; 261/94–98, DIG. 9

[56] References Cited

U.S. PATENT DOCUMENTS

| | | | |
|---|---|---|---|
| 1,493,579 | 5/1924 | Walter | 95/200 |
| 3,624,984 | 12/1971 | Ferrari et al. | 95/199 |
| 3,679,765 | 7/1972 | Houston, Jr. et al. | 95/199 X |
| 3,927,153 | 12/1975 | Tarhan | 95/200 X |
| 3,957,464 | 5/1976 | Teller | 95/196 |
| 3,960,507 | 6/1976 | Tsujikawa et al. | 55/233 X |
| 4,150,958 | 4/1979 | Jablin | 95/199 |
| 4,192,659 | 3/1980 | Kiang | 95/199 |
| 4,589,889 | 5/1986 | Spencer | 55/229 X |
| 4,619,693 | 10/1986 | Takai et al. | 261/DIG. 9 |
| 4,952,247 | 8/1990 | Schrader et al. | 95/235 X |
| 5,354,482 | 10/1994 | Varadi | 55/228 X |

FOREIGN PATENT DOCUMENTS

| | | |
|---|---|---|
| 516205 | 12/1992 | European Pat. Off. |
| 1 594 760 | 7/1990 | France. |
| 24 50 719 | 4/1976 | Germany. |
| 41 13 108 | 5/1992 | Germany. |

*Primary Examiner*—Richard L. Chiesa
*Attorney, Agent, or Firm*—Herbert Dubno

[57] ABSTRACT

Exhaust gas is brought into contact with a washing liquid chiefly consisting of water in at least two washing stages. In the last washing stage, fresh water and/or a washing liquid containing fresh water is sprayed into the exhaust gas. In the penultimate washing stage, the exhaust gas is brought in contact with a circulating aqueous salt solution, which contains substances supplied by the exhaust gas. In the penultimate washing stage, the exhaust gas is passed through a washing zone at temperatures in the range from 30° to 150° C., where the quantity of aqueous salt solution passed into the washing zone per Nm$^3$ exhaust gas flowing through the washing zone is 0.1 to 10 liters. The exhaust gas coming from the penultimate washing zone has a temperature in the range from 30° to 80° C., is saturated with steam for 90 to 100%, and does not contain more than 50% by weight of the dust content of the exhaust gas before the same enters the penultimate washing stage. In the last washing stage, the exhaust gas is passed through a gas-permeable, turbulence producing layer. In the last washing stage, preferably 0.05 to 2 liters washing liquid per Nm$^3$ exhaust gas are sprayed into the exhaust gas.

11 Claims, 1 Drawing Sheet

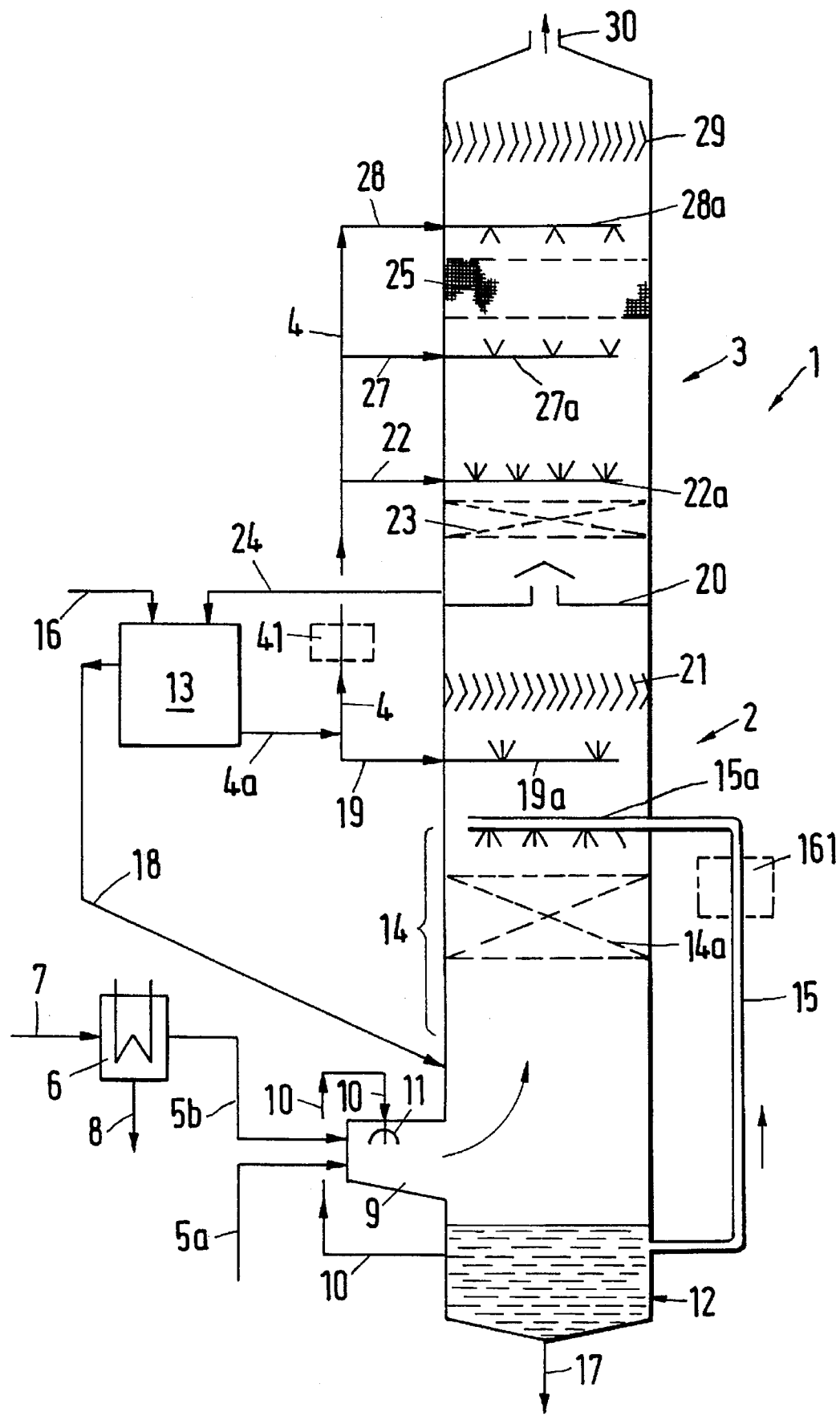

EXHAUST GAS SCRUBBING PROCESS

FIELD OF THE INVENTION

Our present invention relates to a process for removing dust and aerosols from an exhaust gas which, in at least two washing stages, is brought in contact with a washing or scrubbing liquid chiefly consisting of water, where in the last washing stage fresh water and/or a washing liquid containing fresh water is sprayed into the exhaust gas, and where in the penultimate washing stage the exhaust gas is brought into contact with a circulating aqueous salt solution that contains substances supplied by the exhaust gas. In particular, the invention relates to improvements in the scrubbing of flue gases.

BACKGROUND OF THE INVENTION

A scrubbing process with a plurality of stages is known from DE-C-41 13 108. A single stage process is described in EP-A-0 516 205.

OBJECTS OF THE INVENTION

It is the principal object of the present invention to provide an improved scrubbing process which can achieve a high degree of purity of the scrubbed gas when working with at least two washing stages, and to be able to not only remove dust and aerosols, but also contain gaseous constituents, in particular HCl and HF from the exhaust gas as efficiently as possible.

Another object is to provide a process for the purposes described whereby the amount of waste water produced is minimized.

SUMMARY OF THE INVENTION

These objects and others which will become apparent hereinafter are attained in accordance with our invention in a process for the scrubbing of dust and aerosols from an exhaust gas, especially a hot exhaust gas such as a flue gas which can contain in addition to the dust and aerosols, HCl and HF which are to be removed from the gas, utilizing a plurality of washing or scrubbing stages and including a last washing or scrubbing stage and a penultimate washing and scrubbing stage. In the last washing stage the washing liquid can be fresh water or a liquid containing fresh water. In the penultimate washing stage the exhaust gas is contacted with a circulating aqueous salt solution containing substances which have been removed from the exhaust gas.

In accordance with the invention, in the penultimate washing stage the exhaust gas is passed through a washing zone at a temperature in the range from 30° to 150° C., to which washing zone a circulating aqueous salt solution is supplied, the amount of solution introduced into the washing zone per $Nm^3$ exhaust gas flowing through the washing zone is 0.1 to 10 liters; and the exhaust gas coming from the washing zone has a temperature in the range form 30° to 80° C., is 90 to 100% saturated with steam and includes not more than 50% by weight of the dust content which the exhaust gas has when entering the penultimate washing stage.

Furthermore in the last washing stage the exhaust gas is passed through a gas-permeable, turbulence-producing layer.

The exhaust gas to be cleaned can, for instance, be a flue gas from the combustion of fossil fuels or their processing residues, or an exhaust gas from a chemical plant. Values of the steam saturation are always given with reference to the saturation of the exhaust gas with pure water ($Nm^3$=standard cubic mater or $m^3$ S.T.P.).

In the process in accordance with the invention the exhaust gas is intensively treated with the circulating aqueous salt solution in the penultimate washing stage, where the cleaning effect of this salt solution is used efficiently. The salt content of this solution is rather high and can amount up to 20% by weight. As a result, only little waste water is produced. The washing zone of the penultimate and/or the last washing stage can include a packing layer, through which the exhaust gas is passed, but this is not necessary in all cases. By providing at least one packing layer, the saturation of the exhaust gas with steam is improved, which results in an improved cleaning efficiency.

The last washing stage, which can also be referred to as fine cleaning stage, chiefly serves to not only wash out dust and aerosols from the exhaust gas, but to also remove residual gaseous constituents like HCl and HF as well as $SO_3$ aerosols. In part already in the penultimate washing stage, the $SO_3$ forms a sulfuric acid aerosol, which cannot easily be separated. Likewise, the separation of extremely fine dust particles having grain sizes below 3 µm and in particular below 1µm is known to be difficult. To achieve good results, provision is made for the exhaust gas to enter the last washing stage at a relatively low temperature in the range from 30° to 80° C. and preferably not more than 70° C., where it is largely saturated with steam. At the same time, a high cleaning efficiency is achieved for the substances to be removed already in the penultimate washing stage, so that the stress on the last washing stage is relieved. Although the number of washing stages is not limited, we can manage with two or not more than three washing stages for cost reasons.

It is advantageous to supply the used washing liquid produced in the last washing stage to a reservoir inside or outside the washing stage, to supply fresh water to the reservoir, and to spray washing liquid from the reservoir into the last washing stage. In addition, a partial stream of the liquid is introduced into the penultimate washing stage. In this way, the salt content of the washing liquid supplied to the last washing stage can easily be adjusted. In the last washing stage, 0.05 to 2 liters of washing liquid per $Nm^3$ of exhaust gas are usually sprayed into the exhaust gas. It is also advantageous to preheat the washing liquid before it is sprayed, e.g. by 1° to 10° C., so as to increase the steam saturation in the last washing stage and possibly achieve an oversaturation. The fresh water to be used should possibly be free from alkaline earths and have a low salt content, so that it has a specific conductivity of not more than 100 µS/cm.

We prefer to supply the exhaust gas to the penultimate washing stage at a temperature of not more than 180° C. Advantageously we can bring the exhaust gas into contact with the circulating aqueous salt solution in a spraying zone before it enters the washing zone, so that it is both enriched with steam and cooled. The cleaning effect of the washing zone is supported by such measure. The salt solution circulating in the penultimate washing stage usually consists of water and the substances absorbed from the exhaust gas. The pH value of the circulating salt solution is usually below 5 and preferably not more than 3. If necessary, chemicals may be added for pH adjustment.

If the exhaust gas is supplied too hot, it can be passed through an indirect heat exchanger before the washing stages, condensate produced can be withdrawn, and it can be supplied first to the spraying zone of the penultimate washing stage at temperatures of 80° to 180° C.

For the process in accordance with the invention it is generally sufficient to employ two washing stages. The exhaust gas first of all enters the penultimate washing stage, which will subsequently also be referred to as first washing stage. The fine cleaning of the exhaust gas will then be effected in the second washing stage, which is the last washing stage, from which the treated exhaust gas is withdrawn. The exhaust gas can then for instance be supplied to a desulfurizing means for removing $SO_2$.

BRIEF DESCRIPTION OF THE DRAWING

The above and other objects, features, and advantages will become more readily apparent from the following description, reference being made to the accompanying drawing in which:

The sole FIGURE of which is a diagrammatic cross section of a scrubbing tower and a flow diagram of associated components.

SPECIFIC DESCRIPTION

The drawing schematically represents a scrubbing tower 1 comprising two washing stages 2 and 3. For the sake of clarity, pumps have been omitted in the lines.

The exhaust gas to be cleaned is supplied in line 5a or alternatively comes from line 5b. Before line 5b an indirect heat exchanger 6 is provided, to which hot exhaust gas, e.g. flue gas, is supplied through line 7. In the heat exchanger 6 the gas is cooled to a temperature in the range from 80° to 180° C., where condensate may be produced, which is withdrawn in line 8. The temperature in line 5a usually lies in the range from 100° to 250° C. or even higher in individual cases.

The exhaust gas to be treated is first of all passed through a spraying zone 9, where it is sprayed with salt solution coming from line 10, and is discharged through one or more nozzles 11. The salt solution is a used washing liquid, which is collected at the bottom or sump 12 of the washing tower 1.

In the spraying zone 9 the raw gas is enriched with steam and also cooled to such an extent that in the first washing stage 2 it flows upwards to enter the washing zone 14 at a temperature of 40° to 80° C. Salt solution from the bottom 12 is supplied through line 15 to the distributing line 15a by means of a pump not represented here, and is then sprayed into the washing zone 14. The washing zone 14 can contain a liquid-permeable packing layer 14a indicated in phantom lines or one or more trays, but this is not absolutely necessary.

The salt solution trickles downwards through the packing layer, where an intensive direct contact with the upwardly flowing flue gas is achieved. With or without a packing layer, in the washing zone 14, dust, gaseous constituents, in particular HCl and HF, as well as part of the aerosols, in particular sulfuric acid aerosol, are taken up by the salt solution. Sulfuric acid aerosol is produced in the indirect heat exchanger 6, in the spraying zone 9 and in the washing zone 14.

The salt solution flows downwards into the bottom 12 and is largely recirculated through line 15. The line 15 can additionally be provided with a cooler 161 indicated in phantom lines, in which cooler the salt solution is cooled indirectly. Part of the solids-containing salt solution is removed from the washing tower through line 17, where it is ensured that the amount of liquid withdrawn is as small as possible. The waste water from line 17 is supplied to a waste-water processing plant not represented here. To keep the amount of liquid present in the first washing zone more or less constant, fresh water can be added at any point, or, as represented in the drawing, liquid containing fresh water can be supplied through line 18 or 19.

The amount of liquid supplied to the washing zone 14 through the distributor 15 lies in the range from 0.1 to 10 l/Nm³ of exhaust gas flowing through the washing zone 14. The amount of liquid supplied through line 15 per unit time is usually about 10 times larger than the amount of liquid flowing through line 10.

Before the exhaust gas leaves the first washing stage 2 and enters the last washing stage 3 through the gas-permeable, liquid-tight tray 20, the exhaust gas will also flow through a droplet separator 21. The droplet separator 21 ensures that liquid containing impurities is largely separated from the exhaust gas. One process variant consists in that fresh water or washing liquid having a low salt content is sprayed from line 19 through the distributor 19a below the droplet separator 21 into the exhaust gas. As a result, the saturation of the exhaust gas with steam is advantageously increased, and at the same time solid deposits in the separator 21 are washed off.

The exhaust gas flowing upwards through the tray 20 has a temperature in the range from 30° to 80° C. and is saturated with steam for 90 to 100%. At the same time, its dust content only amounts to not more than 50% by weight of the dust content which the exhaust gas coming from the spraying zone 9 has when entering the washing zone 14.

In the second and also last washing stage 3 the upwardly flowing exhaust gas intensively mixed with washing liquid containing fresh water, which washing liquid is discharged from the distributor 22a. The washing liquid is supplied through line 22, which branches off from the distributing line 4. The washing liquid comes from the reservoir 13 and the connecting line 4a. Used washing liquid, which accumulates on the tray 20, is supplied in line 24 to the reservoir 13, which also has a fresh water supply line 16. As has already been described, part of the liquid in the reservoir 13 can be supplied to the liquid reservoir in the bottom 12 through line 18. In this way, the solids and salt content of the liquid in the distributing line 4 can be kept low, and the cleaning efficiency can be improved.

It may be expedient to pass the washing liquid in line 4 through a heat exchanger 41 indicated in phantom lines, so as to heat the washing liquid. A heating by 1° to 10° C. already noticeably improves the steam saturation in the last washing stage 3 and can lead to the desired oversaturation.

By means of the distributor 22a, the liquid upwardly directed through nozzles is introduced into the likewise upwardly flowing exhaust gases a fine mist-like spray. The nozzles of the distributor 22a can be designed such that, beside the liquid, air or steam are in addition discharged at a high pressure, in order to achieve a mist-like liquid distribution.

We can pass the steam-containing exhaust gas entering the last washing stage 3 through a packing layer 23. This might possibly improve the distribution of the steam in the exhaust gas and the saturation of the exhaust gas with steam. In particular when omitting the packing layer 14a, the packing layer 23 is recommended, but it is also possible to use both layers.

Virtually saturated with steam, the exhaust gas enters a gas-permeable, turbulence-producing layer 25 from below. This layer 25 can have different designs, and can for instance be a packing layer or a knitted fabric layer, and gas-permeable trays are also possible in this case. The layer 25 serves for the agglomeration of mist particles and aerosols and at the same time their separation. Liquid droplets formed in the layer 25 drop downwards and accumulate on the tray 20, from where they are withdrawn through line 24.

As an alternative process it may be expedient to supply washing liquid from line 4 through line 27 and additionally spray the same through the attached distributor 27a, or to supply washing liquid through line 28 to a distributor 28a disposed above the layer 25, from where it is sprayed onto the layer 25. Other than in the drawing, fresh water can also be supplied through lines 28 and 27 to the respective distributor.

The upwardly flowing flue gas coming from the agglomeration layer 25 is passed through a droplet separator 29, in which the remaining separation of agglomerated mist particles and aerosols is effected, before the flue gas leaves the washing tower 1 through the outlet 30. The gas leaving the washing tower 1 can be supplied to a not represented desulfurizing unit, which serves to remove $SO_2$. One possibility is to connect the outlet 30 with the heat exchanger 6 and to use the relatively cold gas ass cooling medium in the indirect heat exchanger 6.

SPECIFIC EXAMPLE

A washing tower 1, as represented in the drawing, comprising two washing zones 2 and 3 and a packing layer 14a in the washing zone 14 is supplied with flue gas from the combustion of heavy oil in an amount of 950 $Nm^3/h$ through line 5a. Other than in the drawing, the reservoir 13 is disposed on the tray 20, and the lines 19, 27 and 28 including the distributors 19a, 27a and 28a as well as the cooler 161 are missing. The flue gas from line 5a contains 8.5% by volume steam and 5.8% by volume $O_2$, and it enters the spraying zone 19 at a temperature of 175° C. and a pressure of 1045 mbar.

The liquid quantities are as follows:

| Line | 10 | 15 | 22 | 16 | 17 | 18 |
|---|---|---|---|---|---|---|
| Quantity (kg/h) | 200 | 14200 | 280 | 66 | 5 | 65 |

The flue gas coming from the spraying zone 9 and flowing to the washing zone 14 has a temperature of 58° C. and is saturated with steam for 92%. When flowing through the tray 20, the flue gas has a temperature of 56° C. and is saturated with steam for 98%. The packing layer 23 was omitted. The distributor 22a is a high-pressure nozzle producing a fine, mist-like spray of washing liquid. As a result, a complete steam saturation and locally even a slight oversaturation of the flue gas is achieved, so that a growth of the aerosol particles through absorption of water is achieved. The layer 25 is a knitted fabric layer made of plastics.

The content of impurities in the flue gas—in $mg/Nm^3$—at various points of the washing tower is indicated in the following table:

|  | Line 5a | Tray 20 | Outlet 30 |
|---|---|---|---|
| Dust | 180 | 40 | 5 |
| $SO_2$ | 3550 | 3540 | 3530 |
| $SO_3$ | 155 | 100 | 12 |
| $No_x$ | 450 | 450 | 450 |
| Chloride | 1.8 | 0.7 | 0 |

The ingredients of the water in line 18 are subsequently indicated in column A, and those in line 17 are indicated in column B (in g/l):

|  | A | B |
|---|---|---|
| $H_2SO4$ | 1.6 | 33 |
| HCl | 0.011 | 0.3 |
| Solids | 0.3 | 14 |
| Heavy metals | 0.12 | 3.5 |

The solids include predominantly carbon, and the heavy metals include predominantly vanadium and nickel.

We claim:

1. A process for scrubbing dust and aerosols from an exhaust gas in a plurality of washing stages including a last washing stage and a penultimate washing stage, said process comprising the steps of:

(a) supplying said exhaust gas to a washing zone in said penultimate washing stage at a temperature in a range of 30° to 150° C.;

(b) contacting said exhaust gas in said washing zone with a circulating aqueous salt solution containing substances removed from said exhaust gas and passed through said washing zone in an amount of 0.1 to 10 liters/$Nm^3$ of the exhaust gas flowing through said washing zone;

(c) discharging a scrubbed exhaust gas from said washing zone to said last washing stage which has a temperature in a range of 30° to 80° C., is 90% to 100% saturated with water vapor, and contains not more than 50% by weight of dust contained in the exhaust gas entering said penultimate washing stage;

(d) in said last washing stage contacting said scrubbed exhaust gas with fresh water or a washing liquid containing fresh water; and (e) passing the scrubbed exhaust gas and said fresh water or said washing liquid through a gas-permeable turbulence-producing layer in said last washing stage.

2. The process defined in claim 1 wherein in the last washing stage 0.05 to 2 liters washing liquid per $Nm^3$ exhaust gas are sprayed into the exhaust gas.

3. The process defined in claim 2 wherein, in the penultimate washing stage, before the exhaust gas enters the last washing stage, washing liquid from a reservoir is sprayed into the exhaust gas.

4. The process defined in claim 1, further comprising heating at least part of the washing liquid, which is sprayed into the last washing stage, before being sprayed.

5. The process defined in claim 1, further comprising passing used washing liquid produced in the last washing stage into a reservoir, supplying fresh water to the reservoir, and spraying washing liquid from the reservoir into the last washing stage.

6. The process defined in claim 1 wherein before entering the washing zone of the penultimate washing stage the exhaust gas is brought in contact with the circulating aqueous salt solution in a spraying zone.

7. The process defined in claim 1 wherein the washing zone of the penultimate washing stage has a packing layer, which is sprinkled with the aqueous salt solution, and through which the exhaust gas is passed.

8. The process defined in claim 1 wherein, in the last washing stage, fresh water or washing liquid containing fresh water is sprayed onto the gas-permeable turbulence-producing layer.

9. The process defined in claim 1 wherein in the last washing stage the exhaust gas is passed through a packing layer, before the exhaust gas is passed through the gas-permeable turbulence-producing layer.

10. The process defined in claim 1 wherein before entering the penultimate washing stage, the exhaust gas is cooled to a temperature of 80° to 180° C. through an indirect heat exchange, and condensate produced is separated.

11. The process defined in claim 1 wherein the exhaust gas is passed through two washing stages.

* * * * *